(12) United States Patent
Hopper

(10) Patent No.: US 7,900,357 B2
(45) Date of Patent: Mar. 8, 2011

(54) SEAL INSTALLATION TOOL AND METHOD OF USING SAME

(75) Inventor: Jeffrey N. Hopper, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1022 days.

(21) Appl. No.: 11/688,306

(22) Filed: Mar. 20, 2007

(65) Prior Publication Data

US 2008/0230999 A1    Sep. 25, 2008

(51) Int. Cl.
*B21K 1/76*   (2006.01)
(52) U.S. Cl. .............. 29/898.07; 29/898.11; 277/345; 277/551
(58) Field of Classification Search ............ 29/898.11, 29/898.07, 426.5, 426.1, 898.08; 277/345, 277/551, 90
See application file for complete search history.

(56) References Cited

U.S. PATENT DOCUMENTS

| 3,505,881 | A | * | 4/1970 | Varner | ............................ 74/5 R |
|---|---|---|---|---|---|
| 4,434,883 | A | * | 3/1984 | Raines | ...................... 192/110 R |
| 4,458,405 | A | * | 7/1984 | Cavagnero et al. | ............. 29/467 |
| 4,541,163 | A | * | 9/1985 | Eiting | ........................... 29/426.5 |
| 4,611,935 | A | * | 9/1986 | Rode | ............................. 384/548 |
| 5,875,550 | A | * | 3/1999 | Kohn | ......................... 29/898.07 |
| 6,467,147 | B2 | * | 10/2002 | Iwata et al. | .................. 29/426.5 |
| 6,601,503 | B2 | * | 8/2003 | Scholzig et al. | .............. 101/184 |

* cited by examiner

*Primary Examiner* — Rick K Chang
(74) *Attorney, Agent, or Firm* — Quinn Law Group, PLLC

(57) ABSTRACT

A seal installation tool assembly and method of using same to install a front seal within a front cover member of an engine. The seal installation tool assembly includes a seal installation sleeve, a threaded fastener, and a washer member. The seal installation sleeve is adapted to receive a front seal and pilots on a drive portion of a crankshaft within the engine. The threaded fastener operates to draw the front seal within the front cover member. Upon contact between the front cover member and the seal installation sleeve, the front seal is properly installed.

10 Claims, 1 Drawing Sheet

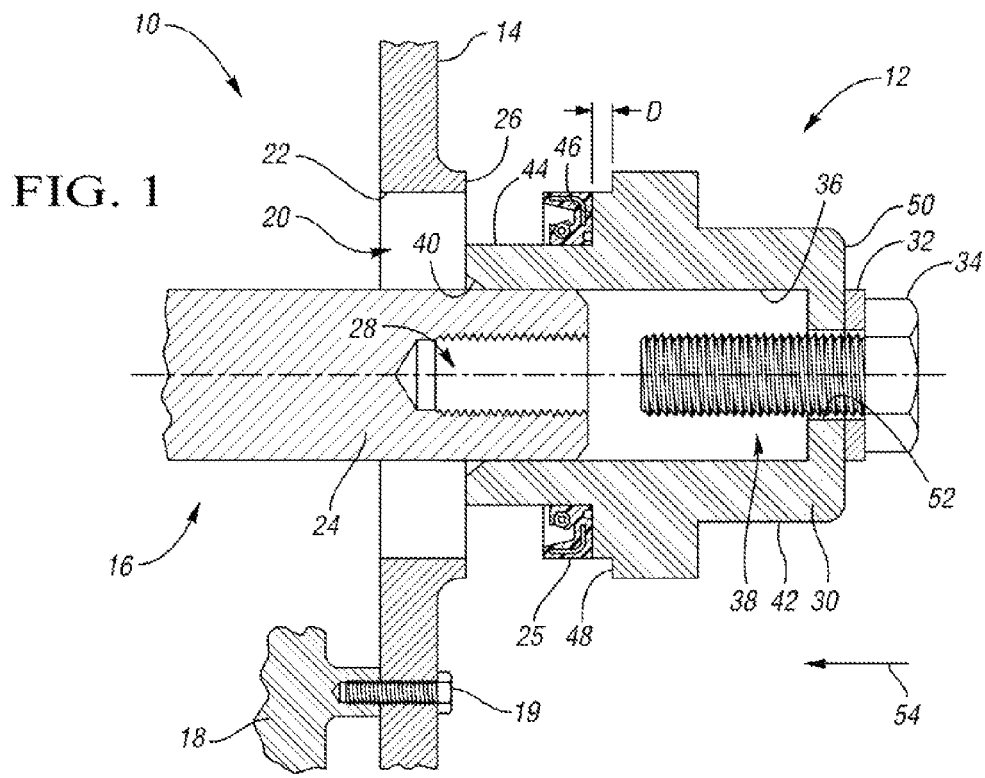
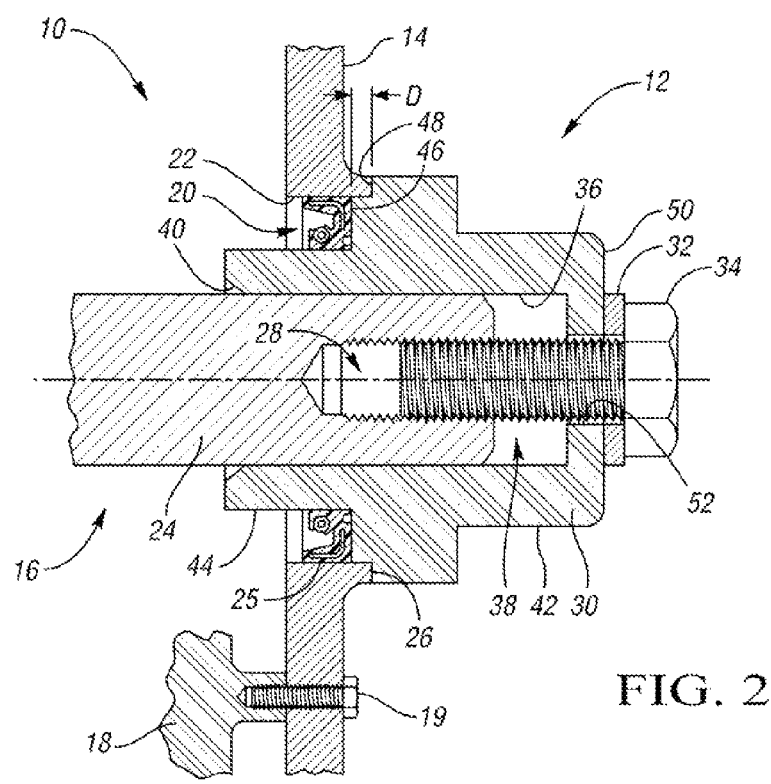

SEAL INSTALLATION TOOL AND METHOD OF USING SAME

TECHNICAL FIELD

The present invention relates generally to tooling apparatus operable to facilitate the installation of seals and more specifically to a tool and a method for installing a front seal of an engine.

BACKGROUND OF THE INVENTION

Vehicles typically include an internal combustion engine, which employs a crankshaft that operates to convert the reciprocal motion of piston or pistons to rotary motion of the crankshaft thereby providing driving force to the wheels. A rotatable drive portion of the crankshaft may extend to the exterior of the engine through a front cover member to provide an attachment point for a harmonic balancer, which may include a pulley member. The harmonic balancer operates to attenuate the torsional vibrations of the crankshaft under certain engine operation conditions. Additionally, the pulley member provides a driving force to an accessory drive system to operate engine accessories such as, for example, a power steering pump, alternator, water pump, air conditioning compressor, etc.

A front seal, such as an annular lip seal, is typically provided between the rotatable drive portion and the front cover member through which it extends. The front seal operates to disallow leakage of engine oil to the exterior of the engine as well as to restrict debris from entering the engine. The front seal is exposed to heat, vibration, and high relative velocities that operate to limit the durability of the front seal. Additionally, improper installation may have deleterious consequences on the sealing effectiveness of the front seal.

SUMMARY OF THE INVENTION

Accordingly, provided is a seal installation tool assembly for installing a seal in a cover member of an engine having a crankshaft with a drive portion defining an axially extending threaded bore. The seal installation tool assembly includes a seal installation sleeve having a generally cylindrical inner surface defining a cylindrical bore operable to slidably pilot the seal installation sleeve on the drive portion. The seal installation sleeve has a generally tiered or stepped outer surface. A seal piloting surface portion is provided on the tiered outer surface, and is sufficiently configured to receive the seal thereon. Additionally, a seal engagement surface portion extends generally radially from the seal piloting surface portion and operates to provide support to the seal. Also provided is a generally radially extending reference surface, which operates to contact the cover member when the seal is fully installed.

The seal installation tool assembly may further include an end portion provided on the seal installation sleeve and defining a bore sufficiently configured to receive a fastener. The fastener can threadingly engage the threaded bore of the drive portion. Additionally, a washer may be provided between the fastener and the end portion to provide a bearing surface to distribute forces to the end portion. Further, the seal engagement surface and the reference surface may be offset by a predetermined distance to install the seal at a predetermined depth within the cover member.

Yet another aspect of the present invention provides a method of installing a seal into a cover member of an engine having a crankshaft with a drive portion defining an axially extending threaded bore. The method includes providing a seal installation sleeve and installing the seal onto the installing sleeve. The operator will then slidably engage the drive portion of the crankshaft with the seal installation sleeve. A force is subsequently provided and operates to urge the seal installation sleeve into contact with the cover member. Subsequently, the seal installation sleeve is removed from the drive portion of the crankshaft such that the seal remains within the cover.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a cross sectional side elevational view of a portion of an engine, having a crankshaft, and a seal installation tool assembly consistent with the present invention, illustrating the relative positions between the crankshaft and the seal installation tool assembly prior to front seal installation; and FIG. 2 is a cross sectional side elevational view of the portion of an engine and the seal installation tool assembly of FIG. 1, illustrating the relative positions between the crankshaft and the seal installation tool upon front seal installation.

DESCRIPTION OF THE PREFERRED EMBODIMENT

Referring to the figures wherein like reference numbers refer to like or corresponding parts, there is shown in FIGS. 1 and 2, a portion of an engine generally shown at 10 and a seal installation tool assembly 12. The engine 10 includes a front cover member 14 and a crankshaft 16, which is rotatably supported within a cylinder case or block 18. Additionally, the front cover member 14 is removably mounted with respect to the cylinder block 18 by fasteners 19, such as hex head fasteners. The front cover member 14 has a generally cylindrical orifice 20, defined by a generally cylindrical surface 22 through which a drive portion 24 of the crankshaft 16 may pass. The surface 22 is radially and axially configured to receive and retain a front seal 25. The front seal 25 is preferably a lip seal operable to contain lubricating oil within the engine 10. A generally radially projecting reference surface 26 is provided on the front cover member 14 about the periphery of orifice 20. A centrally located, axially extending threaded bore 28 is defined by the drive portion 24. Those skilled in the art will recognize that the drive portion 24 is sufficiently configured to receive a harmonic balancer, not shown.

The seal installation tool assembly 12 includes a seal installation sleeve 30, a washer member 32, and a threaded fastener 34. The seal installation sleeve 30 includes a generally cylindrical inner surface 36, which defines a cylindrical bore 38 sufficiently configured to receive the drive portion 24. The seal installation sleeve 30 is preferably made from a metal with sufficient structural rigidity, such as steel or aluminum; however, those skilled in the art will recognize that other materials such as plastics or composites may be used while remaining within the scope of that which is claimed. An annular radius or chamfer 40 is provided at the opening of the bore 38 to facilitate the insertion of the drive portion 24 into the seal installation sleeve 30. The seal installation sleeve 30 includes an outer surface 42 that has a generally annular step-like or tiered configuration. The outer surface 42 includes a generally cylindrical seal piloting surface 44. The radial dimension of the seal piloting surface 44 is such that the seal 25 may slide thereon, as shown in FIG. 1. Projecting radially from the seal piloting surface 44 is a seal engagement surface 46. Spaced axially from the seal engagement surface 46, by a distance or offset D, is a radially projecting reference surface 48.

An end portion 50 of the seal installation sleeve 30 defines a bore 52 sufficiently configured to receive the threaded fastener 34. The threaded fastener 34 has a thread pitch and diameter complementary to the thread pitch and diameter of the threaded bore 28. The washer member 32 forms a bearing surface to evenly distribute the forces exerted by the threaded fastener 34 to the seal installation sleeve 30. The threaded fastener 34 in the preferred embodiment is a hex head fastener; however, those skilled in the art will recognize other types of fasteners that may be used, such as, a stud and nut.

In operation, the front seal 25 is installed with respect to the seal installation sleeve 30 by translating the front seal 25 along the seal piloting surface 44 until it is firmly seated against the seal engagement surface 46, as shown in FIG. 2. The seal engagement surface 46 provides support to the front seal 25 over 360 degrees to avoid the tilting or cocking of the front seal 25 during installation. Subsequently, the operator will slide the seal installation sleeve 30 over the drive portion 24 of the crankshaft 16. The drive portion 24 pilots and axially aligns the seal installation sleeve 30, such that the threaded fastener 34 can threadably engage the threaded bore 28. The operator may then rotate the threaded fastener 34, in a tightening direction, using a socket wrench or other suitable tool. By rotating the threaded fastener 34, the seal installation sleeve 30 is drawn leftward, as illustrated by arrow 54 (FIG. 1), toward the front cover member 14. The operator will continue to rotate the threaded fastener 34, in a tightening direction, until the reference surface 48 of the seal installation sleeve 30 engages the reference surface 26 of the front cover member 14, as shown in FIG. 2. At this point, the front seal 25 is fully inserted within the front cover member 14. Those skilled in the art will recognize that the offset D may be tailored to the application thereby defining the depth within the front cover member 14 to which the front seal 25 is inserted. Upon installation of the seal, the operator may then rotate the threaded fastener 34, in a loosening direction, such that the threaded fastener 34 will disengage the threaded bore 28. Removal of the seal installation sleeve 30 from the drive portion 24 is now possible, while the front seal 25 remains within the front cover member 14.

Advantageously, the seal installation tool assembly 12 enables the proper installation of the seal 25 to the correct depth without removing the front cover member 14 from the engine 10, which often requires the removal of additional parts and in some cases, the removal of the engine 10. Additionally, the seal installation tool assembly 12 is compact in size such that the seal installation tool assembly occupies less space than a typical harmonic balancer. Therefore, spatial constraints within the vehicle engine compartment when operating the seal installation tool assembly 12 are of little concern.

While the best modes for carrying out the invention have been described in detail, those familiar with the art to which this invention relates will recognize various alternative designs and embodiments for practicing the invention within the scope of the appended claims.

The invention claimed is:

1. A seal installation tool assembly for installing a seal in a cover member of an engine having a crankshaft with a drive portion defining an axially extending threaded bore, the seal installation tool assembly comprising:
   a seal installation sleeve having a generally cylindrical inner surface defining a cylindrical bore operable to slidably pilot said seal installation sleeve on the drive portion and said seal installation sleeve having a tiered outer surface;
   a seal piloting surface portion of said tiered outer surface, said seal piloting surface portion being sufficiently configured to receive the seal thereon;
   a seal engagement surface portion extending generally radially from said seal piloting surface portion and operable to provide support to the seal;
   a generally radially extending reference surface operable to contact the cover member when the seal is fully installed; a threaded fastener; an end portion provided on said seal installation sleeve, said end portion defining a bore sufficiently configured to receive said fastener; wherein said fastener can threadingly engage the threaded bore of the drive portion.

2. The seal installation tool assembly of claim 1, further comprising:
   a washer member;
   wherein said washer member is disposed between said end portion and said threaded fastener, said washer member being operable to distribute forces to said end potion.

3. The seal installation tool assembly of claim 1, wherein said seal engagement surface and said reference surface are offset by a predetermined distance to install the seal at a predetermined depth within the cover member.

4. The seal installation tool assembly of claim 1, wherein said seal installation sleeve defines a generally annular chamfer to facilitate insertion of said cylindrical bore onto the drive portion.

5. The seal installation tool assembly of claim 1, wherein said seal installation sleeve is formed from one of steel, aluminum, plastic, and composite.

6. A seal installation tool assembly for installing a front seal in a front cover member of an engine having a crankshaft with a drive portion defining an axially extending threaded bore, the seal installation tool assembly comprising:
   a seal installation sleeve having a generally cylindrical inner surface defining a cylindrical bore operable to slidably pilot said seal installation sleeve on the drive portion and said seal installation sleeve having a tiered outer surface;
   a threaded fastener;
   an end portion provided on said seal installation sleeve, said end portion defining a bore sufficiently configured to receive said fastener;
   wherein said fastener threadingly engages the threaded bore of the drive portion;
   a seal piloting surface portion of said tiered outer surface, said seal piloting surface being sufficiently configured to receive the front seal thereon;
   a seal engagement surface portion extending generally radially from said seal piloting surface and operable to provide support to the front seal; and
   a generally radially extending reference surface operable to contact the front cover member when the front seal is fully installed.

7. The seal installation tool assembly of claim 6, further comprising:
   a washer member;
   wherein said washer member is disposed between said end portion and said threaded fastener, said washer member being operable to distribute forces to said end potion.

8. The seal installation tool assembly of claim 6, wherein said seal engagement surface and said reference surface are offset by a predetermined distance to install the front seal at a predetermined depth within the front cover member.

9. The seal installation tool assembly of claim 6, wherein said seal installation sleeve defines a generally annular chamfer to facilitate insertion of said cylindrical bore onto the drive portion.

10. The seal installation tool assembly of claim 6, wherein said seal installation sleeve is formed from one of steel, aluminum, plastic, and composite.

* * * * *